(No Model.)
W. W. COURTER.
OPEN HEAD SPRING.
No. 361,991. Patented Apr. 26, 1887.
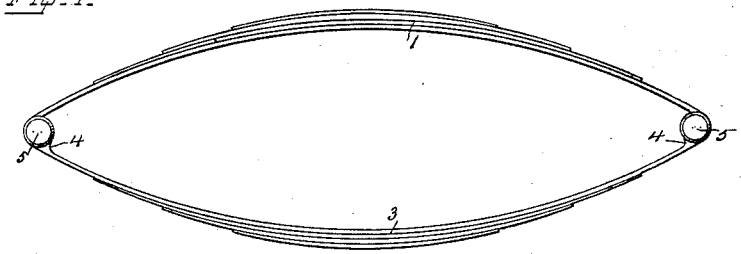
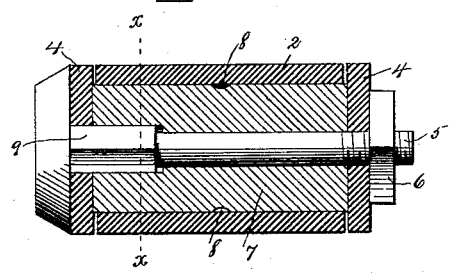 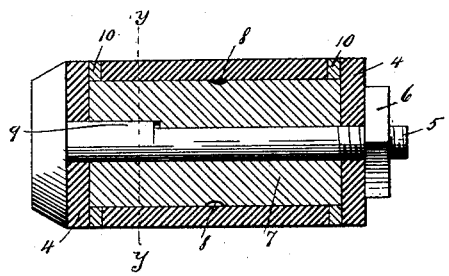
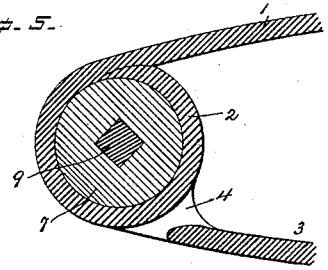 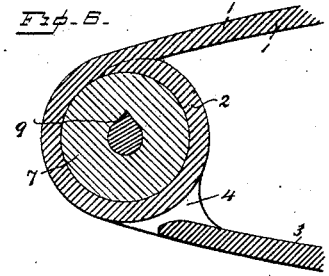
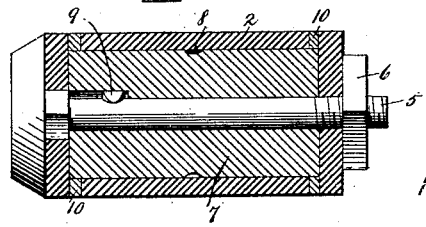
Witnesses.
E. D. Smith
C. E. Ruggles.
Inventor.
William W. Courter
By
A. W. Wooster
Atty.

UNITED STATES PATENT OFFICE.

WILLIAM W. COURTER, OF BRIDGEPORT, CONNECTICUT, ASSIGNOR TO THE BRIDGEPORT SPRING PERCH COMPANY, OF SAME PLACE.

OPEN-HEAD SPRING.

SPECIFICATION forming part of Letters Patent No. 361,991, dated April 26, 1887.

Application filed December 4, 1886. Serial No. 220,644. (No model.)

*To all whom it may concern:*

Be it known that I, WILLIAM W. COURTER, a citizen of the United States, residing at Bridgeport, in the county of Fairfield and State of Connecticut, have invented certain new and useful Improvements in Open-Head Springs; and I do hereby declare the following to be a full, clear, and exact description of the invention, such as will enable others skilled in the art to which it appertains to make and use the same.

My invention relates to the manufacture of vehicle-springs, and has special reference to the class of springs known as "open-head springs"—that is, springs in which the eye of one leaf (ordinarily the upper leaf) is secured between two independent eyes upon the other leaf—the joint—that is, the head of the spring—being left entirely open. In this class of springs, as ordinarily constructed, a bolt, either fixed or loose, passes through both ears and the eye upon the other leaf. The principal objections to these constructions have been that owing to the small amount of bearing-surface the bolt and eye quickly become worn, so that a continual rattling takes place in each eye of the spring, the only remedy for which has been to tighten up the bolt, thus binding the ears against the ends of the eye, and frequently "setting" the spring. Furthermore, in addition to the rattling in the eye, there has been a squeaking produced by friction of the eye upon the bolt and against the ears. These objections are wholly overcome in the improved construction, which I will now describe, referring by numbers to the accompanying drawings, forming part of this specification, in which—

Figure 1 is an elevation of an ordinary elliptic spring. Figs. 2, 3, and 4 are enlarged sections through the eye of a spring of this class, showing slight variations in the manner in which I have applied my invention; Fig. 5, a section on the line *x x* in Fig. 2; and Fig. 6 is a section on the line *y y* in Fig. 3.

1 denotes the upper leaf, having an eye, 2; 3, the lower leaf, having ears 4; and 5, the bolt passing through both ears and the eye, the parts being retained in operative position by a nut, 6, on the bolt. Instead of making the eye thick and heavy, as heretofore, I reduce the thickness of the eye and provide a sleeve, 7, through which the bolt passes, and which forms the bearing for the eye. This sleeve or bushing may of course be made of any suitable metal—as, for example, iron, brass, Babbitt metal, or deoxidized metal. It being desirable to reduce the friction as much as possible, I preferably provide a groove, 8, upon the outer surface of the sleeve to contain oil, hard grease, or any suitable lubricant. As it is of course desirable that the bolt should not turn in the eye, or the sleeve upon the bolt, I provide an enlargement, 9, upon the bolt to prevent it from turning and to hold the sleeve. This enlargement engages one ear and the sleeve, and may be a squared portion, as in Fig. 2, a rib or spline, as in Fig. 3, or a pin projecting from the bolt, as in Fig. 4, the opening through the sleeve at one end being made to correspond in shape with the enlargement of the bolt, as shown in Figs. 5 and 6. As it is essential under all circumstances that the eye should turn freely on the sleeve, I have made the sleeve slightly longer than the width of the eye, so that, no matter how tightly the bolt may be drawn up, the ears will not bind upon the ends of the eye, as is clearly shown in Figs. 2, 3, and 4.

In Figs. 3 and 4 I have shown the width of the eye as slightly reduced, and washers 10 placed at each end of the eye and filling the space between the eye and the ears, so that squeaking is rendered impossible. This construction I preferably adopt in practice.

It will of course be understood that the various details of construction may be modified within reasonable limits without departing from the spirit of my invention.

I claim—

1. As a new manufacture, a spring consisting, essentially, of upper and lower leaves, one being provided with an eye and the other with a pair of ears, a bolt passing through said ears and provided with an enlargement, whereby it is held against rotation, and a sleeve upon the bolt, also held against rotation by said enlargement, upon which the eye bears, and against which the ears are drawn by the bolt.

2. A spring consisting of upper and lower leaves, one having an eye and the other a pair of ears, a bolt passing through said ears and provided with an enlargement, whereby it is held against rotation, a sleeve upon said bolt, also held against rotation by said enlargement, upon which the eye bears, and washers on said sleeve lying between the ends of the eye and the ears.

3. In an open-head spring, the combination, with the two leaves, having, respectively, an eye and a pair of ears, of a bolt provided with an enlargement, whereby it is held against rotation in one of the ears, and a sleeve upon the bolt, also held against rotation by said enlargement, upon which the eye bears, and against which the ears are drawn by the bolt.

4. The combination, with the upper and lower leaves of a spring, having, respectively, an eye and a pair of ears, and a bolt passing through said ears and provided with an enlargement, whereby it is held against rotation, of a sleeve on said bolt held against rotation by said enlargement and made slightly longer than the width of the eye, and washers 10 between the ends of the eye and the ears.

5. The upper and lower leaves, having, respectively, an eye and a pair of ears, and a sleeve, 7, having a groove, 8, for a lubricant, upon which the eye bears and against which the ears are drawn, in combination with a bolt having an enlargement, 9, which passes through said ears and sleeve, said enlargement acting to hold the bolt stationary in the ears and the sleeve stationary upon the bolt.

In testimony whereof I affix my signature in presence of two witnesses.

WILLIAM W. COURTER.

Witnesses:
A. M. WOOSTER,
C. E. RUGGLES.